United States Patent
Backman et al.

(10) Patent No.: US 10,180,107 B2
(45) Date of Patent: Jan. 15, 2019

(54) SYSTEM AND METHOD FOR ADJUSTING COMBUSTOR FUEL SPLIT

(71) Applicant: General Electric Company, Schenectady, NY (US)

(72) Inventors: Steven William Backman, Simpsonville, SC (US); Trevor Valder Jones, Greenville, SC (US); Daniel Joseph Flavin, Simpsonville, SC (US); Scott Michael Schaberg, Simpsonville, SC (US); Kelly Marie Kurylo, Greer, SC (US)

(73) Assignee: GENERAL ELECTRIC COMPANY, Schenectady, NY (US)

( * ) Notice: Subject to any disclaimer, the term of this patent is extended or adjusted under 35 U.S.C. 154(b) by 148 days.

(21) Appl. No.: 15/453,399

(22) Filed: Mar. 8, 2017

(65) Prior Publication Data

US 2018/0258863 A1   Sep. 13, 2018

(51) Int. Cl.
  *F02C 9/26* (2006.01)
  *F02C 3/04* (2006.01)
  *F02C 7/228* (2006.01)
  *G05B 19/042* (2006.01)

(52) U.S. Cl.
  CPC .............. *F02C 9/26* (2013.01); *F02C 3/04* (2013.01); *F02C 7/228* (2013.01); *G05B 19/0426* (2013.01); *F05D 2220/32* (2013.01); *F05D 2240/35* (2013.01); *F05D 2270/54* (2013.01); *G05B 2219/25419* (2013.01)

(58) Field of Classification Search
  None
  See application file for complete search history.

(56) References Cited

U.S. PATENT DOCUMENTS

| | | | |
|---|---|---|---|
| 7,058,617 | B1 | 6/2006 | Hartman et al. |
| 7,246,002 | B2 | 7/2007 | Healy et al. |
| 2007/0055392 | A1 | 3/2007 | D'Amato et al. |
| 2007/0073525 | A1 | 3/2007 | Healy et al. |
| 2009/0125207 | A1 | 5/2009 | Nomura et al. |
| 2009/0222187 | A1 | 9/2009 | Martling et al. |
| 2010/0286890 | A1* | 11/2010 | Chandler .......... F02C 9/28 701/100 |
| 2010/0300108 | A1* | 12/2010 | Demougeot ........ F02C 7/228 60/773 |
| 2011/0265487 | A1 | 11/2011 | Gauthier et al. |

(Continued)

FOREIGN PATENT DOCUMENTS

EP   1331448 A2   7/2003

*Primary Examiner* — Kenneth M Lo
*Assistant Examiner* — Istiaque Ahmed
(74) *Attorney, Agent, or Firm* — Fletcher Yoder, P.C.

(57) ABSTRACT

A non-transitory computer readable storage medium storing one or more processor-executable instructions wherein the one or more instructions when executed by a processor of a controller, cause acts to be performed is provided. The acts to be performed include controlling a fuel split to a combustor of a gas turbine utilizing automatic tuning and switching control of the fuel split to the combustor of the gas turbine to utilizing an adjusted fixed fuel split schedule instead of automatic tuning. The adjusted fixed fuel split schedule includes a fixed fuel split schedule adjusted via a biasing value, and the biasing value is based on both the fixed fuel split schedule and an automatic tuning based fuel split.

20 Claims, 2 Drawing Sheets

(56) References Cited

U.S. PATENT DOCUMENTS

2012/0023953 A1* 2/2012 Thomas ................ F02C 7/228
60/772
2012/0275899 A1* 11/2012 Chandler ................ F02C 9/28
415/1

* cited by examiner

SYSTEM AND METHOD FOR ADJUSTING COMBUSTOR FUEL SPLIT

BACKGROUND

The subject matter disclosed herein relates to gas turbines and, more particularly, to systems and methods for controlling fuel splits to a gas turbine combustor.

Gas turbine systems typically include at least one gas turbine engine having a compressor, a combustor, and a turbine. Gas turbine systems have control systems (e.g., controllers) that monitor and control their operation. These controllers govern the combustion system of the gas turbine and other operational aspects of the turbine. For example, a controller controls the fuel splits for the combustor to maintain the desired combustion mode (e.g., during part-load total fuel flow) and operate the gas turbine within established operational boundaries (e.g., combustion dynamics). During part-load operation, the combustor fuel splits can greatly influence the production of harmful emissions, such as carbon-monoxide (CO) and nitrogen-oxide (NOx). Proper control of the fuel splits is needed to maintain the gas turbine within emissions compliance.

BRIEF DESCRIPTION

Certain embodiments commensurate in scope with the originally claimed invention are summarized below. These embodiments are not intended to limit the scope of the claimed invention, but rather these embodiments are intended only to provide a brief summary of possible forms of the invention. Indeed, the invention may encompass a variety of forms that may be similar to or different from the embodiments set forth below.

In accordance with a first embodiment, a non-transitory computer readable storage medium storing one or more processor-executable instructions wherein the one or more instructions when executed by a processor of a controller, cause acts to be performed is provided. The acts to be performed include controlling a fuel split to a combustor of a gas turbine utilizing automatic tuning and switching control of the fuel split to the combustor of the gas turbine to utilizing an adjusted fixed fuel split schedule instead of automatic tuning. The adjusted fixed fuel split schedule includes a fixed fuel split schedule adjusted via a biasing value, and the biasing value is based on both the fixed fuel split schedule and an automatic tuning based fuel split.

In accordance with a second embodiment, a gas turbine controller configured to control a fuel split to a combustor of a gas turbine is provided. The gas turbine controller is programmed to control the fuel split to the combustor of the gas turbine utilizing automatic tuning, and to switch control of the fuel split to the combustor of the gas turbine to utilizing an adjusted fixed fuel split schedule instead of automatic tuning. The adjusted fixed fuel split schedule includes a fixed fuel split schedule adjusted via a biasing value, and the biasing value is based on both the fixed fuel split schedule and an automatic tuning based fuel split.

In accordance with a third embodiment, a system is provided. The system includes a gas turbine and a controller communicatively coupled to the gas turbine. The controller is configured to control a fuel split to a combustor of the gas turbine. The controller is programmed to control the fuel split to the combustor of the gas turbine utilizing automatic tuning, and to switch control of the fuel split to the combustor of the gas turbine to utilizing an adjusted fixed fuel split schedule instead of automatic tuning. The adjusted fixed fuel split schedule includes a fixed fuel split schedule adjusted via a biasing value, and the biasing value is based on a difference between the fixed fuel split schedule and an automatic tuning based fuel split.

BRIEF DESCRIPTION OF THE DRAWINGS

These and other features, aspects, and advantages of the present invention will become better understood when the following detailed description is read with reference to the accompanying drawings in which like characters represent like parts throughout the drawings, wherein.

DETAILED DESCRIPTION

One or more specific embodiments of the present invention will be described below. In an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present invention, the articles "a," "an," "the," and "said" are intended to mean that there are one or more of the elements. The terms "comprising," "including," and "having" are intended to be inclusive and mean that there may be additional elements other than the listed elements.

Typically, during operation of the gas turbine, an automated tuning system may be utilized to control the fuel split (e.g., with automatic tuning based fuel split) of the combustor to maintain emissions and combustion dynamics within specified limits. Under certain conditions (e.g., extremely high combustion dynamics, large deviations in parameters (power levels), etc.), the controller switches to a fixed fuel split schedule or table for controlling the fuel split. However, the fixed fuel split may not enable the gas turbine to operate at an emission compliant load. The disclosed embodiments are directed to a system and method for controlling a fuel split to a combustor of a gas turbine engine. For example, a controller may be provided that controls a fuel split of the combustor utilizing an adjusted fixed fuel split schedule. The adjusted fixed fuel split schedule may be derived by determining a difference (e.g., biasing value) between the latest automatic tuned based fuel split and the fixed fuel split schedule and applying (e.g., subtracting or adding) the difference to the fixed fuel split schedule. Utilization of the adjusted fixed fuel split schedule may provide more robust combustion operability (e.g., compared to utilizing the fixed fuel schedule) with regard to emissions, stability margin, combustion dynamics, and lean blow out margin.

Figure 1:
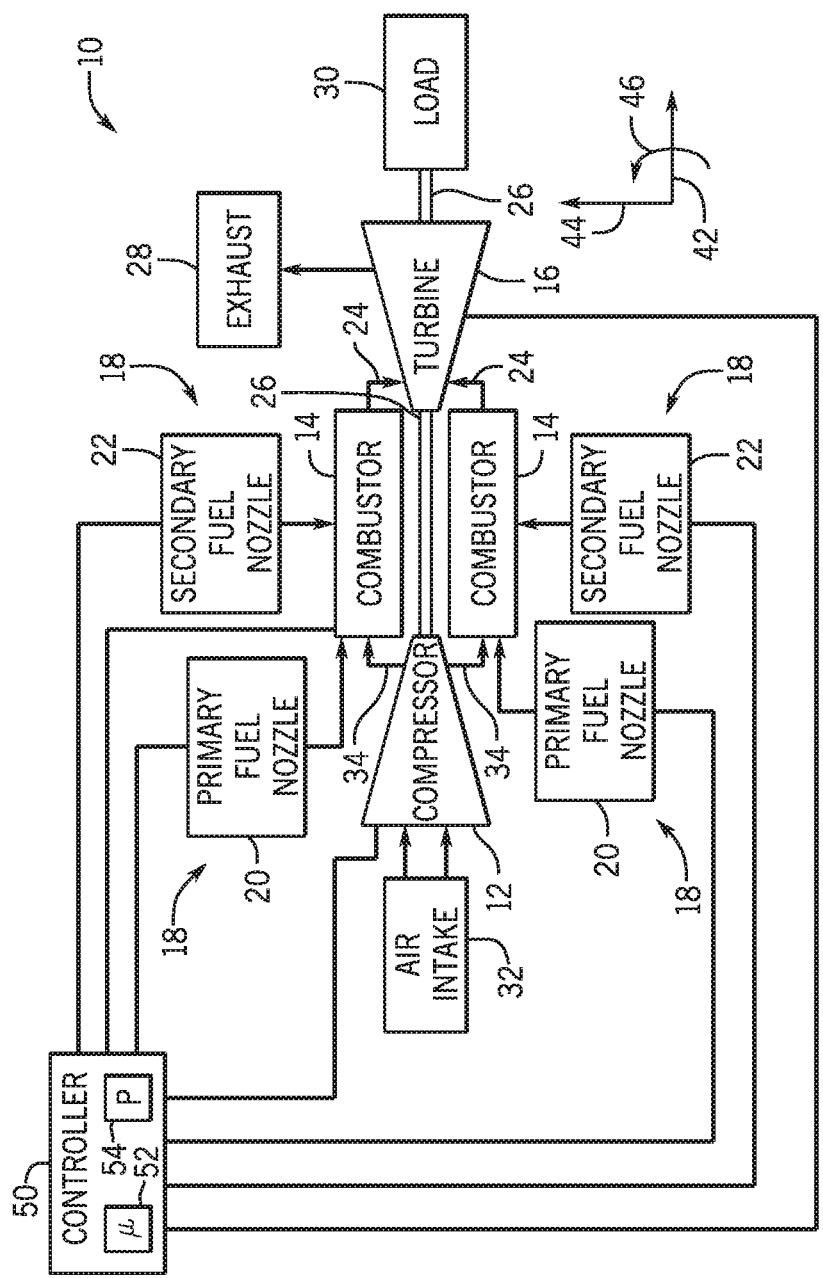
FIG. 1 is a block diagram of an embodiment of a gas turbine system coupled to a controller.

Turning now to the drawings, FIG. 1 illustrates a block diagram of an embodiment of a gas turbine system 10. The gas turbine system 10 includes a compressor 12, turbine combustors 14, and a turbine 16. The turbine combustors 14 includes fuel nozzles 18 which route a liquid fuel, a gas fuel (e.g., natural gas), and/or a blended fuel (e.g., a mixture of natural gas and process gas) into the turbine combustors 14. For example, the process gas may include a blast furnace gas, a coke oven gas, a refinery flue gas, a synthetic gas generated as a result of a refinery or chemical process, or a combination thereof. As shown, each turbine combustor 14 may have multiple fuel nozzles 18. More specifically, the turbine combustors 14 may each include primary fuel nozzles 20 and secondary fuel nozzles 22. The primary fuel nozzles 20 are for natural gas, and the secondary fuel nozzles 22 are for an alternate fuel, which is typically a distillate. As discussed in detail below, the primary fuel nozzles 20 and secondary fuel nozzles 22 receive fuel for use within the turbine combustors 14. In certain embodiments, the combustors 14 may be part of a Dry-Low NOx (DLN) combustion system. The turbine combustors 14 ignite and combust an oxidant-fuel mixture (e.g., an air-fuel mixture), and then pass resulting hot pressurized combustion gasses 24 (e.g., exhaust) into the turbine 16. Turbine blades within the turbine 16 are coupled to a shaft 26 of the gas turbine system 10, which may also be coupled to several other components throughout the turbine system 10. As the combustion gases 24 flow against and between the turbine blades of the turbine 16, the turbine 16 is driven into rotation, which causes the shaft 26 to rotate. Eventually, the combustion gases 24 exit the turbine system 10 via an exhaust outlet 28. Further, in the illustrated embodiment, the shaft 26 is coupled to a load 30, which is powered via the rotation of the shaft 26. The load 30 may be any suitable device that generates power via the rotational output of the turbine system 10, such as an electrical generator, a propeller of an airplane, or other load.

The compressor 12 of the gas turbine system 10 includes compressor blades. The compressor blades within the compressor 12 are coupled to the shaft 26, and will rotate as the shaft 26 is driven to rotate by the turbine 16, as discussed above. As the compressor blades rotate within the compressor 12, the compressor 12 compresses air (or any suitable oxidant) received from an air intake 32 to produce pressurized air 34. The pressurized air 34 is then fed into the fuel nozzles 18 of the combustors 14. As mentioned above, the fuel nozzles 18 mix the pressurized air 34 and fuel to produce a suitable mixture ratio for combustion, e.g., a combustion that causes the fuel to more completely burn, so as not to waste fuel or cause excess emissions. In the following discussion, reference may be made to an axial direction or axis 42 (e.g., a longitudinal axis) of the combustor 14, a radial direction or axis 44 of the combustor 14, and a circumferential direction or axis 46 of the combustor 14.

As depicted in FIG. 1, a controller 50 (e.g., electronic and/or processor-based controller) is communicatively coupled to one or more components of the gas turbine system 10. In certain embodiments, the controller 50 is a gas turbine controller, a fuel controller, and/or a combination thereof. In certain embodiments, the controller 50 may include more than one controller. In certain embodiments, the controller 50 may receive feedback regarding a plurality of operating parameters (temperatures, pressures, flow, etc.) from sensors (e.g., flow sensors, temperature sensors, pressure sensors, speed sensors, etc.) disposed throughout the system. In certain embodiments, the controller 50 may adjust one or more components of the system 10 via actuators.

The controller 50 includes a memory 52 (e.g., a non-transitory computer-readable medium/memory circuitry) communicatively coupled to a processor 54. Each memory 52 stores one or more sets of instructions (e.g., processor-executable instructions) implemented to perform operations related to the components of the system 10. More specifically, the memory 52 may include volatile memory, such as random access memory (RAM), and/or non-volatile memory, such as read-only memory (ROM), non-volatile random access memory (NVRAM), optical drives, hard disc drives, or solid-state drives. Additionally, the processor 54 may include one or more application specific integrated circuits (ASICs), one or more field programmable gate arrays (FPGAs), one or more general-purpose processors, or any combination thereof. Furthermore, the term processor is not limited to just those integrated circuits referred to in the art as processors, but broadly refers to computers, processors, microcontrollers, microcomputers, programmable logic controllers, application specific integrated circuits, and other programmable circuits.

The controller 50 is configured to control the combustion system. In particular, the controller may regulate the fuel flowing from a fuel supply to the combustor 14. The controller 50 may also select the type of fuel for the combustor 14. In addition, the controller 50 may generate and implement fuel split commands that determine the fuel portion of the fuel flowing to various fuel circuits of the combustors 14. For example, the primary fuel nozzles 20 may be fed a fuel (e.g., gas fuel) via 4 different circuits and the controller 50 may control the split to each of these circuits. In certain embodiments, the controller 50 may also control the fuel split to circuits feeding the secondary fuel nozzles 22. The fuel split commands correspond to a fuel split percentage for each fuel circuit, which defines what percentage of the total amount of fuel delivered to the combustor 14 is supplied through a particular fuel circuit. In particular, the controller 50 may utilize an automatic tuning (e.g., autotune) system for controlling the fuel split of the combustor 14. The autotune system automatically adjusts operating parameters (e.g., fuel ratio) to maintain emissions and combustion dynamics within specified limits. As a default (e.g., when kicked out of the autotune system due to extremely high combustion dynamics, large deviations in parameters, etc.), the controller 50 may utilize a fixed fuel split schedule in controlling the fuel split of the combustor. The fixed fuel split schedule is typically more conservative than the autotune based fuel split. The fixed fuel split schedule typically sets the fuel splits to a certain percentage based on an operating parameter (e.g., load) of the gas turbine system 10.

In certain embodiments, when the controller 50 ceases utilizing the autotune system (e.g., due to be being kicked out) for controlling fuel splits, the controller 50 is configured to switch (e.g., instantaneously) to utilizing an adjusted fixed fuel split schedule or table. During the most recent time period for utilization of the autotune system, the controller 50 is configured to compare the autotune based fuel split to the fixed fuel split schedule to determine a difference (i.e., biasing value) between them. In certain embodiments, the biasing value is an average over the most recent time period that the autotune system was utilized in controlling the fuel split. The controller 50 is configured to store the biasing value in the memory 52 (e.g., NVRAM). The controller 50 is configured to adjust the fixed fuel split schedule by the biasing value (e.g., via adding or subtracting the biasing value) to generate the adjusted fixed fuel split schedule utilized in controlling the fuel split to the combustors 14. In certain embodiments, the biasing value can represent a percent change. Utilization of the adjusted fixed fuel split schedule may provide more robust combustion operability (e.g., compared to utilizing the fixed fuel schedule) with regard to emissions, stability margin, combustion dynamics, and lean blow out margin.

Figure 2:
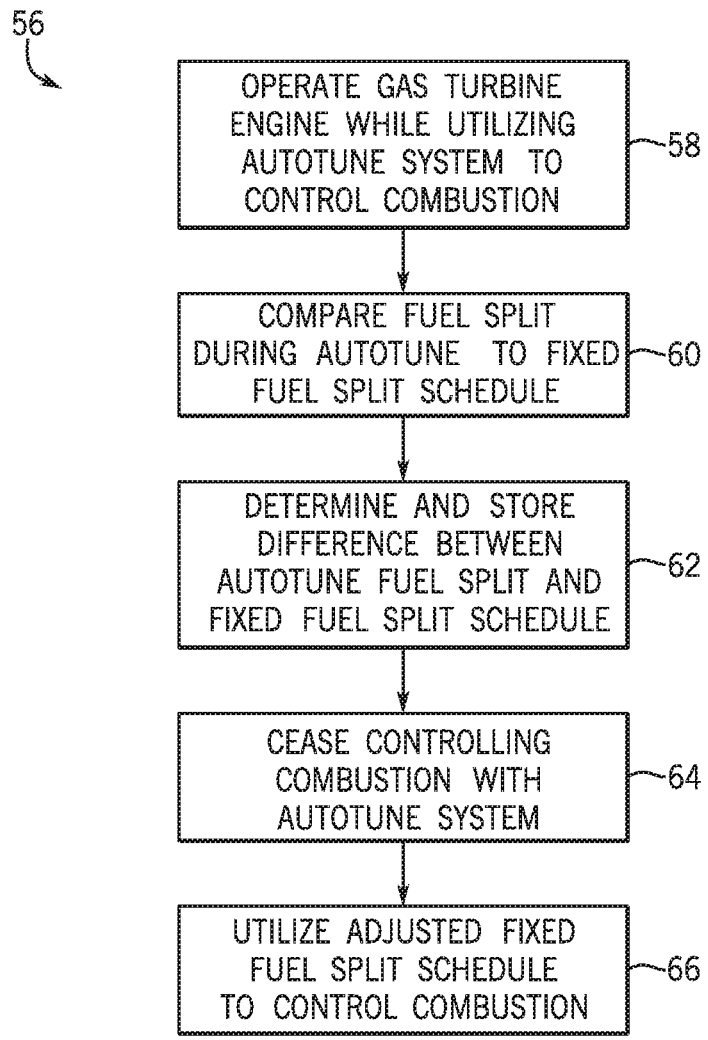
FIG. 2 is a flow chart of an embodiment of a method for controlling a fuel split to a combustor of a gas turbine.

FIG. 2 is a flow chart of an embodiment of a method 56 for controlling a fuel split to the combustor(s) 14 of the gas turbine 10. The method 56 may be performed by the controller 50. One or more steps of the method 56 may be performed simultaneously or in a different sequence from the sequence in FIG. 2. The method 56 includes operating the gas turbine 10 while utilizing the autotune system to control the fuel split to the combustor 14 of the gas turbine 10 (block 58). The method 56 also includes (while utilizing autotune) comparing the fuel split utilized with autotune (e.g., autotune based fuel split) to the fixed fuel split schedule (block 60). The method 56 further includes (while utilizing autotune) determining and storing or logging the difference (i.e., biasing value) between the autotune based fuel split and the fixed fuel split schedule (block 62). In certain embodiments, the difference or biasing value is stored in the memory 52 (e.g., NVRAM). In certain embodiments, the biasing value is an average over the most recent time period that the autotune system was utilized in controlling the fuel split. The method 56 even further includes ceasing controlling the fuel split to the combustor 14 with the autotune system (block 64). In certain embodiments, the controller 50 stops utilizing autotune due to presence of certain conditions (e.g., extremely high combustion dynamics, large deviations in parameters (power levels), etc.). The method 56 yet further includes switching to (e.g., instantaneously) and utilizing an adjusted fixed fuel split schedule to control the fuel split to the combustor 14 (block 66). As noted above, the adjusted fixed fuel split schedule is generated by the controller 50 by applying the biasing value to the fixed fuel split schedule.

Technical effects of the invention include a system and method for controlling a fuel split to a combustor of a gas turbine engine. For example, a controller may be provided that controls a fuel split of the combustor utilizing an adjusted fixed fuel split schedule. The adjusted fixed fuel split schedule may be derived by determining a difference (e.g., biasing value) between the latest automatic tuned based fuel split and the fixed fuel split schedule and applying (e.g., subtracting or adding) the difference to the fixed fuel split schedule. Utilization of the adjusted fixed fuel split schedule may provide more robust combustion operability (e.g., compared to utilizing the fixed fuel schedule) with regard to emissions, stability margin, combustion dynamics, and lean blow out margin.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

The invention claimed is:

1. A non-transitory computer-readable storage medium storing one or more processor-executable instructions wherein the one or more instructions, when executed by a processor of a controller, cause acts to be performed comprising:

controlling a fuel split to a combustor of a gas turbine utilizing automatic tuning; and switching control of the fuel split to the combustor of the gas turbine to utilizing an adjusted fixed fuel split schedule instead of automatic tuning, wherein the adjusted fixed fuel split schedule comprises a fixed fuel split schedule adjusted via a biasing value, and the biasing value is based on both the fixed fuel split schedule and an automatic tuning based fuel split.

2. The non-transitory computer-readable storage medium of claim 1, wherein the acts to be performed comprise determining the biasing value based on both the fixed fuel split schedule and the automatic tuning based fuel split.

3. The non-transitory computer-readable storage medium of claim 2, wherein determining the biasing value comprises comparing the fixed fuel split schedule to the automatic tuning based fuel split.

4. The non-transitory computer-readable storage medium of claim 3, wherein determining the biasing value comprises determining a difference between the fixed fuel split schedule and the automatic tuning based fuel split.

5. The non-transitory computer-readable storage medium of claim 4, wherein the acts to be performed comprise storing the difference between the fixed fuel split schedule and the automatic tuning based fuel split.

6. The non-transitory computer-readable storage medium of claim 4, wherein the acts to be performed comprise adjusting the fixed fuel split schedule with the biasing value.

7. The non-transitory computer-readable storage medium of claim 6, wherein adjusting the fixed fuel split schedule comprises subtracting the biasing value from the fixed fuel split schedule.

8. The non-transitory computer-readable storage medium of claim 6, wherein adjusting the fixed fuel split schedule comprises adding the biasing value to the fixed fuel split schedule.

9. The non-transitory computer-readable storage medium of claim 4, wherein the biasing value comprises an average biasing value determined over a most recent time period that utilized automatic tuning to control the fuel split.

10. A gas turbine controller configured to control a fuel split to a combustor of a gas turbine, wherein the gas turbine controller is programmed to control the fuel split to the combustor of the gas turbine utilizing automatic tuning, and to switch control of the fuel split to the combustor of the gas turbine to utilizing an adjusted fixed fuel split schedule instead of automatic tuning, and wherein the adjusted fixed fuel split schedule comprises a fixed fuel split schedule adjusted via a biasing value, and the biasing value is based on both the fixed fuel split schedule and an automatic tuning based fuel split.

11. The gas turbine controller of claim 10, wherein the gas turbine controller is programmed to determine the biasing value based on both the fixed fuel split schedule and the automatic tuning based fuel split.

12. The gas turbine controller of claim 11, wherein the gas turbine controller is programmed to determine the biasing value by comparing the fixed fuel split schedule to the automatic tuning based fuel split and determining a difference between the fixed fuel split schedule and the automatic tuning based fuel split.

13. The gas turbine controller of claim 12, wherein the gas turbine controller is programmed to store the difference between the fixed fuel split schedule and the automatic tuning based fuel split.

14. The gas turbine controller of claim 12, wherein the gas turbine controller is programmed to adjust the fixed fuel split schedule with the biasing value.

15. The gas turbine controller of claim 14, wherein the gas turbine controller is programmed to adjust the fixed fuel split schedule by subtracting the biasing value from the fixed fuel split schedule.

16. The gas turbine controller of claim 14, wherein the gas turbine controller is programmed to adjust the fixed fuel split schedule by adding the biasing value to the fixed fuel split schedule.

17. The gas turbine controller of claim 12, wherein the biasing value comprises an average biasing value determined over a most recent time period that utilized automatic tuning to control the fuel split.

18. A system, comprising:
a gas turbine; and
a controller communicatively coupled to the gas turbine and configured to control a fuel split to a combustor of the gas turbine, wherein the controller is programmed to control the fuel split to the combustor of the gas turbine utilizing automatic tuning, and to switch control of the fuel split to the combustor of the gas turbine to utilizing an adjusted fixed fuel split schedule instead of automatic tuning, and wherein the adjusted fixed fuel split schedule comprises a fixed fuel split schedule adjusted via a biasing value, and the biasing value is based on a difference between the fixed fuel split schedule and an automatic tuning based fuel split.

19. The system of claim 18, wherein the controller is programmed to adjust the fixed fuel split schedule by adding the biasing value to the fixed fuel split schedule or subtracting the biasing value to the fixed fuel split schedule.

20. The system of claim 18, wherein the biasing value comprises an average biasing value determined over a most recent time period that utilized automatic tuning to control the fuel split.

\* \* \* \* \*